Aug. 4, 1970　　　W. M. PAGE ET AL　　　3,522,867
FLUID PRESSURE OPERATED CLUTCH AND GEARS WITH INTERCLOCK

Filed April 15, 1968　　　　　　　　　　　　　5 Sheets-Sheet 1

INVENTORS.
Wilbur Mills Page
Ralph Coupland
By: Norris & Bateman
Attys.

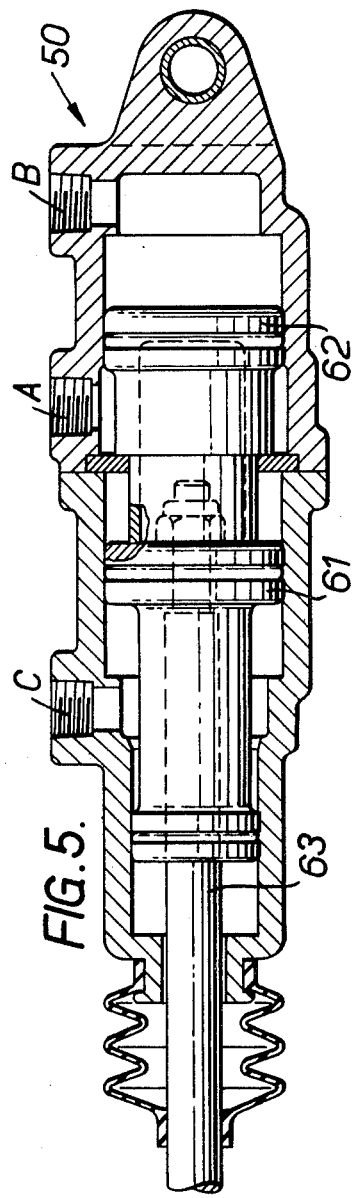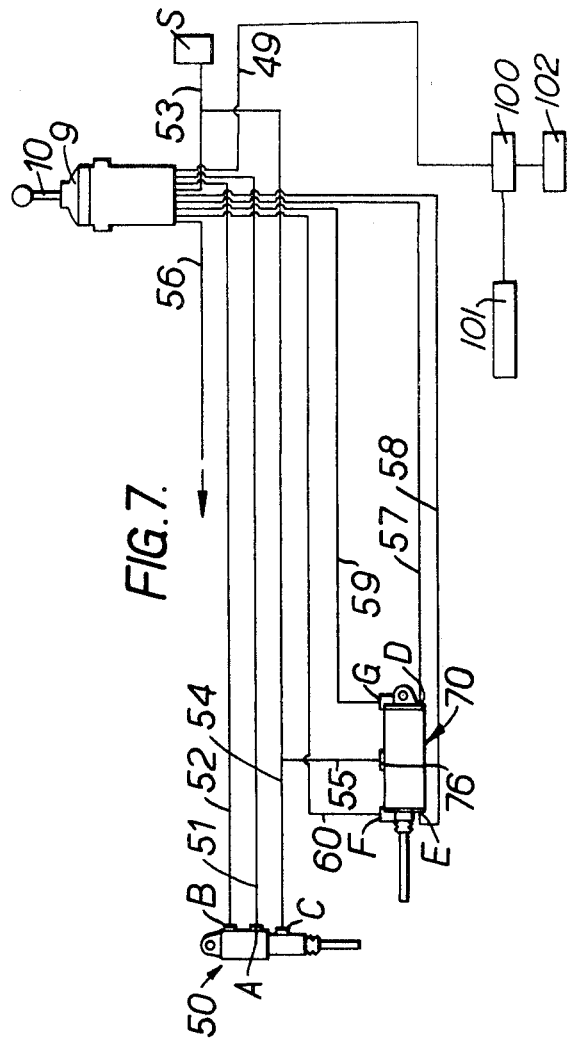

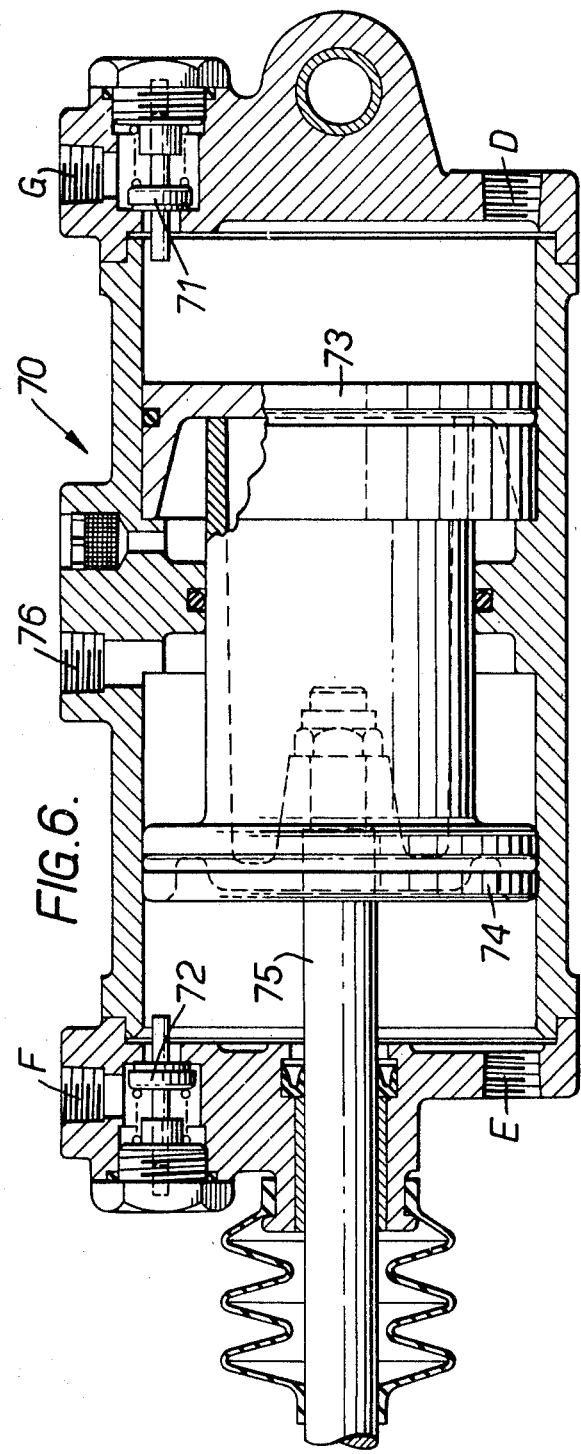

United States Patent Office 3,522,867
Patented Aug. 4, 1970

3,522,867
FLUID PRESSURE OPERATED CLUTCH AND GEARS WITH INTERLOCK
Wilbur M. Page and Ralph Coupland, Lincoln, England, assignors to Clayton Dewandre Company Limited, Lincoln, England, a British company
Filed Apr. 15, 1968, Ser. No. 721,404
Claims priority, application Great Britain, Apr. 20, 1967, 18,278/67
Int. Cl. F16d 67/00
U.S. Cl. 192—3.63      9 Claims

ABSTRACT OF THE DISCLOSURE

An air pressure operated gear changing system for the remote control and actuation of a gear box and comprising a control valve mechanism, a gear selector motor and a gear shift motor. The valve mechanism includes a manually operable hand lever movable to effect operation of the selector motor and shift motor and a clutch interlock control to prevent a gear engaging or gear disengaging movement of the gear shift motor until the clutch is disengaged.

---

This invention relates to air pressure operated gear changing systems and more particularly to compressed air operated systems for the remote control and actuation of a synchromesh gear box.

The present invention aims to provide an improved gear changing system which includes means for preventing the driver endeavouring to engage a gear or initiating a gear change until the clutch has been disengaged.

A further aim of the present invention is to provide a system of the character above mentioned in which the gear operating lever is normally held "in gear" by an air pressure motor but in which said lever remains locked in gear in the event of a failure of the compressed air supply as a warning to the driver, it being possible under these conditions to disengage the clutch to permit engine starting and build up of air pressure in the system.

According to the invention, there is provided a fluid pressure operated gear changing systems comprising a control valve mechanism, a gear selector motor and a gear shift motor, said valve mechanism including a manually operable hand lever movable in a first plane to effect an operation of the gear selector motor and movable in a second plane at right angles to the first to effect operation of the gear shift motor, and said control valve mechanism also including a clutch interlock control actuated by compressed air derived from an associated air pressure operated clutch actuating motor and operable to prevent a gear engaging or gear disengaging movement of the gear shitf motor until the clutch is disengaged.

Preferably, the hand lever is pivotally mounted on a pin carried in a U-shaped trunnion structure pivotally secured to a housing for said control valve mechanism. The hand lever may be provided with an extension which is received in a fork formed with or secured to a hollow rock shaft which is pivotally mounted on a pin secured to said housing.

The clutch interlock control may comprise a number of lugs on the rock shaft arranged to co-act with a corresponding member of fingers carried by pistons movable in chambers connected to an associated clutch whereby, when the clutch is withdrawn, the fingers are moved out of engagement with the lugs to permit a chosen gear to be selected. Preferably, two lugs and co-acting fingers are provided and are so shaped that one locks the rock shaft in the neutral position whilst the other locks the shaft in either of the "in gear" positions.

Preferably, sensing means are also provided for indicating when a selected gear has been engaged. This has the effect of warning a driver not to re-engage the clutch until the gear shift motor has performed a full stroke, i.e. until a selected gear has been engaged.

The invention will now be further described, by way of example, with reference to the accompanying drawings in which:

FIG. 5 is a section through one example of a gear selector motor according to the invention;

FIG. 6 is a section through one example of a gear shift motor according to the invention; and FIG. 7 is a diagrammatic view of the gear changing system according to the invention.

Figure 1:
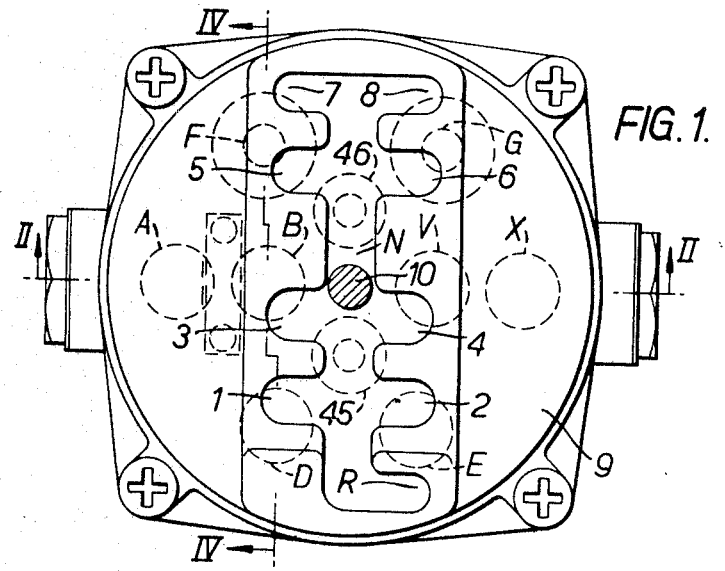
FIG. 1 is a plan view of a housing containing one example of a control valve mechanism according to the invention.

Referring to the drawings, the valve housing shown in FIGS. 1 to 4 is closed at its upper side by a domed cover 9 provided with a gate therein (FIG. 1). The valve mechanism illustrated is for use with a gear box having eight forward gears and one reverse gear and the positions for selecting the forward gears are denoted respectively by slots 1 to 8. The reverse gear position is denoted by slot R.

A hand lever 10 extends through the gate and is pivotally mounted beneath said gate on a pin 11 carried in the ends of an inverted yoke shaped trunnion structure 12 pivotally mounted on a pair of opposed trunnion pins 13, 14 carried by the valve housing such that oscillatory movement of the hand lever 10 longitudinally of the gate, i.e. in the main or neutral slot N, rocks the trunnion 12 about the pins 13, 14.

Figure 2:
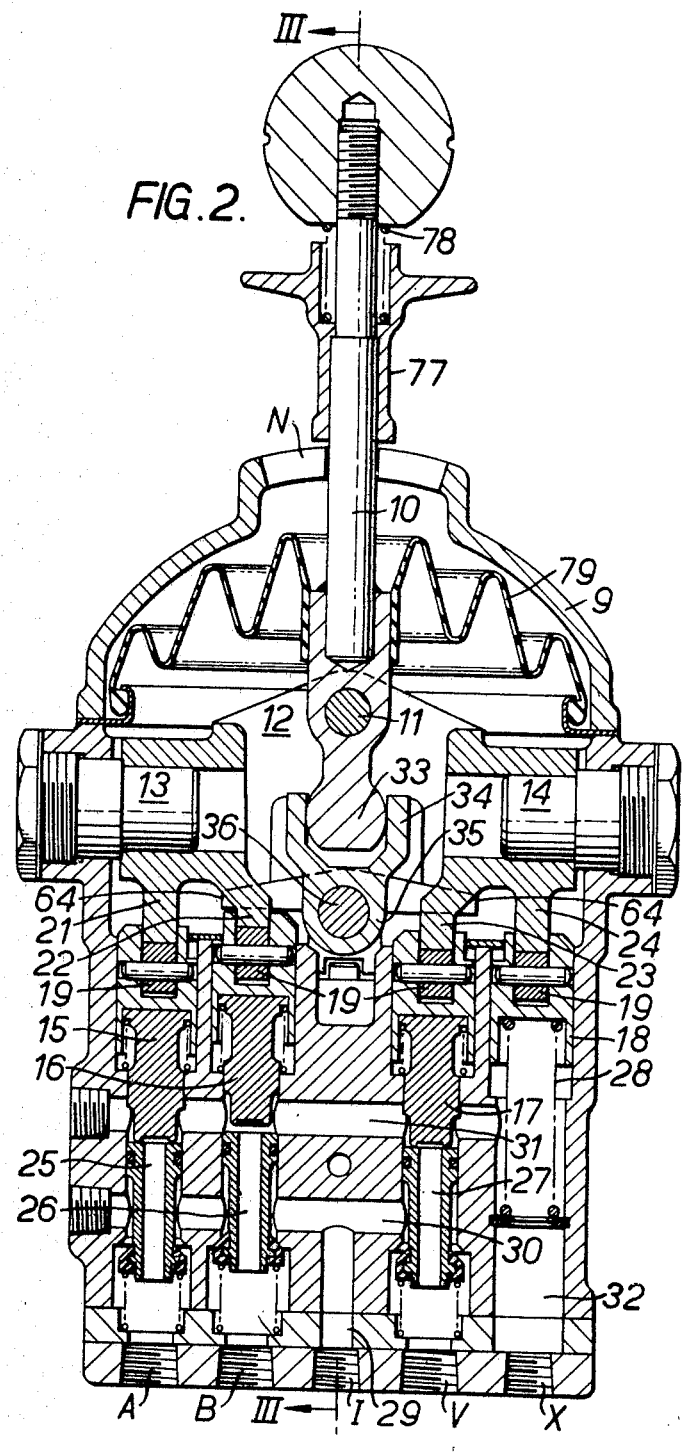
FIG. 2 is a section taken along the line II—II in FIG. 1 looking in the direction of the arrows.

Disposed beneath the trunnion structure 12 is a bank of spring-loaded pistons 15, 16, 17, 18 each of which is provided in its crown with a cam follower roller 19. A corresponding number of cams 21, 22, 23, 24 are provided on the trunnion structure 12 for operation on the respective pistons 15-18 via the rollers 19. Disposed beneath the pistons 15, 16, 17 are respective hollow valve members 25, 26, 27 as shown in FIG. 2. When the valves controlled by members 25-27 are open fluid is allowed to flow from an inlet port I through passages 29 and 30 to respective valve ports A, B and V. The pistons 15 to 17 are urged by their springs away from their respective valve members 25 to 27 and when the pistons are not in contact with the valve members, as shown by piston 16 and valve 26 in FIG. 2, the ports A, B, V are in contact with an exhaust port X via a passage 31 in the valve housing. The passage 31 leads to, and the exhaust port X leads from, a chamber 32 housing the piston 18. In this position, the valve members cut off the supply of fluid from the inlet to their respective valve ports.

The cams are so arranged that movement of the hand lever 10 is a position facing slots 3 and 4 will open valves 25 and 26 and fluid pressure is allowed to pass to ports A and B in the gear selector motor 50 shown in FIG. 5 through lines 51, 52 (FIG. 7) connected respectively to ports A and B in the valve housing. Fluid is also supplied to a port C in the gear selector motor by lines 53 and 54 leading from a fluid source S which also supplies fluid to the inlet port I in the valve housing. In this position of the hand lever 10, pistons 61 and 62 in the gear selector motor are in the extreme left hand position of the motor illustrated in FIG. 5.

Movement of the hand lever 10 to the position facing slots 1 and 2 closes valve 25 but keeps open valve 26.

Fluid is therefore still supplied to port B in the gear selector motor 50 and piston 62 is maintained in its left hand position. Piston 61 however is moved to the right by the fluid from port C until it bears against piston 62 as shown in FIG. 5 and the fluid previously between the two pistons passes through port A along line 51 to port A in the valve housing and thence through the hollow valve member 25 and passage 31 to the exhaust port X. Movement of piston 61 to the right is effective to move a shaft 63 secured thereto also to the right and thus actuate a gear change lever of an associated gear box (not shown).

Movement of the hand lever 10 through the neutral position to the position facing slots 5 and 6 opens the valve 27 and fluid is supplied from port V via line 56 to a range-change cylinder (not shown) whereby the upper four gears may be selected. When the hand lever faces slots 5 and 6, only valve 26 is open but when the hand lever is moved to the position facing slots 7 and 8 both valves 25 and 26 are open.

Movement of the hand lever to the other end of the neutral slot N to the position facing slot R is effective to close all of the valves 25 to 37. Fluid is thus cut off from ports A and B and the fluid from port C moves both pistons 61 and 62 to the extreme right-hand position of the motor shown in FIG. 5 and thus shaft 63 is moved to the right actuating the gear box gear change lever (not shown). Fluid is exhausted from the right-hand side of each of the pistons 61 and 62 through respective ports A, B and valve members 25, 26 to passage 31 and hence the exhaust port X.

The spring-loaded piston 18 provides a spring delay or detent which is arranged to be operated when the hand lever is moved from fourth to fifth gear to provide a "feel" or "dwell" and to slow down the movement between these gears. The spring 28 for piston 18 is located in chamber 32 as shown in FIG. 2.

Figure 3:
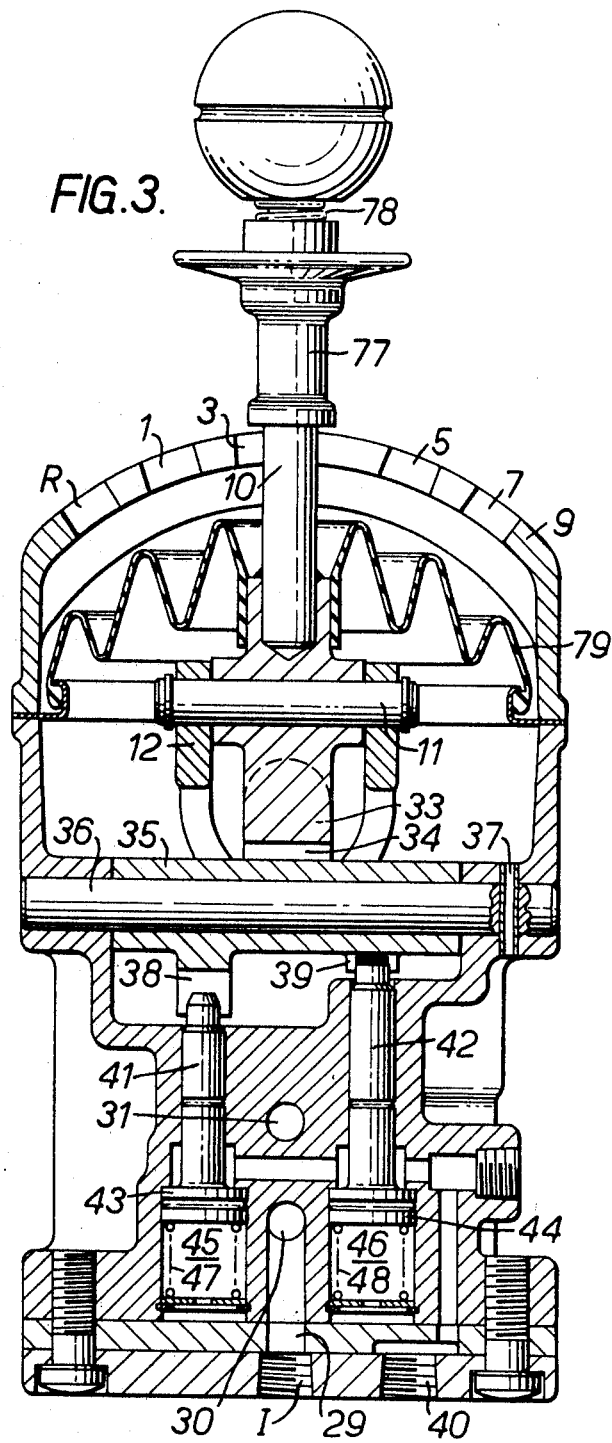
FIG. 3 is a section taken on the line III—III in FIG. 2 in the direction of the arrows.

The hand lever 10 has a spherical extension 33 on its lower end which is received in a fork 34 formed with a transverse hollow rock shaft 35 which is mounted on a spindle 36 secured to the valve housing by a pin 37. Movement of the hand lever 10 transversely of the neutral slot N pivots said rock shaft 35. Movement of the hand lever in this direction is however normally prevented by clutch interlock means which comprises two radical lugs 38, 39 on the rock shaft 35 co-acting with fingers 41, 42 carried by pistons 43, 44 movable in chambers 45, 46 connected to an inlet port 40 in the base of the valve housing (FIG. 3). The inlet port 40 is connected by a line 49 to the hydraulic/air valve and actuating motor assembly 100 of an associated clutch shown at 101 in FIG. 7 and the arrangement is such that, when the clutch is withdrawn, air or other fluid under pressure from a source indicated at 102 is admitted to the chambers 45, 46 via port 40 to force the pistons 43, 44 against the loading of springs 47, 48 in the direction to move the fingers 41, 42 out of engagement with the lugs 38, 39 on rock shaft 35. The hand lever can then be moved into one of the slots 1 to 8 or R and the clutch re-engaged when the loading springs 47, 48 force the fingers 41, 42 via pistons 43, 44 into engagement with the lugs on the rock shaft 35. Clutch 101 is suitably disposed in a power transmitting train containing the controlled gear box.

Extending laterally from the rock shaft 35 one at each side thereof are two arms 64 engaging respectively a pair of spring-loaded pistons 65. Each piston 65 is arranged to act on a spring-loaded poppet type valve 66, the two valves controlling feed of compressed air to the ends of a gear shift motor or cylinder 70 (FIG. 6). Opposed to each valve actuating arm 64 is a further arm 67 (FIG. 4) co-acting with a spring-loaded piston 68 forming part of a sensing means.

When the hand lever 10 is in the neutral slot N, the two arm actuated valves 66 (only one shown in FIG. 4) are in the open position and supply fluid to respective valve ports D and E of the valve housing and thence via lines 57 and 58 to respective ports D and E at the ends of the gear shift cylinder 70. The fluid passed to the ends of cylinder 70, on reaching a predetermined pressure, passes through respective, spring-loaded, non-return valves 71, 72 and ports G, F provided in the ends of the cylinder, and is led via lines 59, 60 to chambers F, G behind the respective sensing pistons 68 in the valve housing. The fluid pressure in the ends of cylinder 70 is effective to force two pistons 73, 74 against each other as shown in FIG. 6. A shaft 75 is secured at one end to the piston 74 and the other end of the shaft is operable to effect gear selection in an associated gear box.

Figure 4:
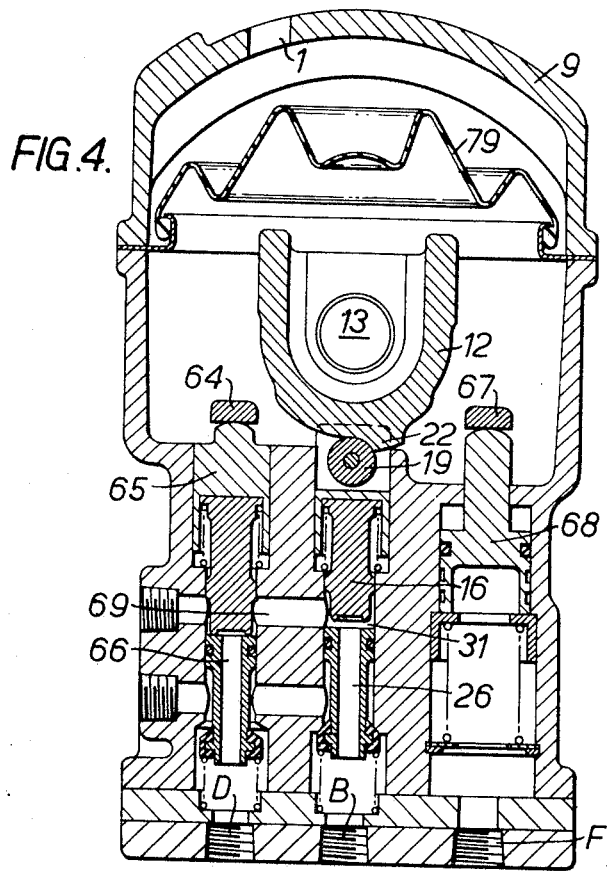
FIG. 4 is a section on line IV—IV in FIG. 1.

When the hand lever 10 is moved out of the neutral slot N into one of the slots 1, 3, 5 or 7 the arms 64 and 67 shown in FIG. 4 respectively force the piston 65 and valve 66 and the piston 68 downwards. At the same time, the other arms 64 and 67 are raised from their respective members and the other piston 65 moves under the action of its spring away from the other valve 66. Said other valve 66 also moves under the action of its spring to shut off the supply of fluid to valve port E. The valves 66 are hollow and when not in contact with their respective pistons 65 are in fluid communication with passage 31 and exhaust port X via a passage 69. Thus port E in cylinder 70 is connected via line 58 to the exhaust port X.

The fluid supplied to the cylinder 70 from port D maintains the piston 73 in its end position as shown in FIG. 6. Since port E is connected to the exhaust port X no pressure is applied to the piston 74 from the end of cylinder 70 having port E and piston 74 is moved towards this end of the cylinder by fluid supplied from surface S via lines 53, 54 and 55 which lead to a port 76 provided in the cylinder between the two pistons 73 and 74. Movement of the piston 74 to the end of the cylinder is effective to move the shaft 75 which is operative to select the chosen gear.

During movement of the piston 74 to the end of the cylinder 70 the chambers F and G in the valve housing remain pressurised and the increased force provided by the spring action on the piston 68 in chamber F tends to rock the hand lever 10 back to the neutral slot N. However, when the piston 74 nears the end of its stroke it contacts the valve member 72 and opens said valve. The fluid in chamber F in the valve housing and line 60 is thus exhausted via port E and the piston in chamber G in the valve housing will thus load the rock shaft and thereby keep the hand lever in the selected slot 1, 3, 5 or 7. This arrangement ensures that the hand lever will not stay in a gear position until the gear shift motor has put the gear box into gear.

When the hand lever is returned to the neutral position, port E is shut off from the exhaust port X and is again connected to the inlet so that the piston 74 is returned to the position shown in FIG. 6. The shaft 75 moves the gear box out of gear and the two pistons 68 ceneralize the hand lever in the neutral slot N to ensure that the valves 66 remain open in the neutral position.

Movement of the hand lever to one of the slots 2, 4, 6 or 8 connects port D in cylinder 70 via line 59 and respective valve 66 to the exhaust port X. The fluid supplied from port E is effective to move pistons 73 and 74 against the force of fluid supplied from port 76 towards port D. As the piston 73 nears the end of its stroke it opens the valve 71 to exhaust chamber G in the valve housing. On reaching the end of the stroke, the piston 74 has moved shaft 75 to the position in which the chosen gear has been selected in the gear box. When the hand lever is returned to the neutral slot, port D is reconnected to the inlet port and the fluid from port D together with the supply fluid from port 76 returns the pistons 73, 74 to the position shown in FIG. 6 against the action of the fluid supplied from port E.

The valve housing cover 9 is provided with a baulk (not shown) whereby reverse gear can only be selected when a sleeve 77 provided on the hand lever 10 is lifted against the action of a spring 78 to clear the said baulk. Selection of reverse gear is otherwise the same as for 2nd, 4th, 6th or 8th gears. The baulk however ensures that reverse gear cannot be selected inadvertently.

A cover 79 of resilient material may be provided if desired to prevent the ingress of dirt, dust or water into the valve housing.

The operation of the gear shift cylinder in the manner described using only two air line controls provides for simple control gear, a minimum of compressed air usage and a constant effort for each movement and a similar mode of operation is used for the gear selector motor.

Although the invention has been described with reference to a gear selection system for eight forward gears, it is possible to use the system according to the invention for a simple four-speed gear box. In the latter case, the two-speed range-changer gear box is omitted as are the associated piston, cylinder and line.

We claim:

1. A fluid pressure operated gear changing system comprising a gear selector motor and a gear shift motor; a control valve mechanism connected by fluid lines to said gear selector motor and said gear shift motor, said control valve mechanism including a manually operable hand lever movable in a first plane to effect an operation of said gear selector motor and movable in a second plane at right angles to said first plane to effect an operation of said gear shift motor; an extension on said hand lever; a fork receiving said hand lever extension and connected to a rock shaft; means pivotally mounting said rock shaft, a clutch and a fluid pressure operated clutch actuating motor; and clutch interlock means preventing movement of said hand lever to effect an operation of the gear shift motor until said clutch is actuated, said clutch interlock means comprising a number of lugs on said rock shaft and a corresponding number of fingers carried by pistons movable in chambers connected by fluid lines to said clutch, and fingers being arranged to co-act with said lugs so that when the clutch is withdrawn said fingers are moved by the associated pistons out of engagement with said lugs to permit movement of the hand lever in said second plane.

2. A gear changing system as claimed in claim 1, including a housing for said control valve mechanism, a U-shaped trunnion structure pivotally secured to said housing, and a pin carried in said trunnion structure; said hand lever being pivotally mounted on said pin.

3. A gear changing system as claimed in claim 1, wherein two lugs and co-acting fingers are provided and are so shaped that one is effective to lock the hand lever in the neutral position and the other is effective to lock the hand lever in position when a gear has been engaged.

4. A gear changing system as claimed in claim 1, including, in addition, sensing means for indicating when a selected gear has been engaged.

5. A gear changing system as defined in claim 4, wherein said sensing means comprises a member associated with said hand lever, arms on said member and a pair of spring loaded pistons arranged to bear on said arms.

6. A fluid pressure operated gear changing system comprising a control valve mechanism, a gear selector motor and a gear shift motor each operably connected to said control valve mechanism, said valve mechanism including a manually operable hand lever movable in a first plane to effect an operation of the gear selector motor and movable in a second plane at right angles to the first to effect operation of the gear shift motor, a housing for said control valve mechanism, a U-shaped trunnion structure pivotally secured to said housing, a pin carried in said trunnion structure, means pivotally mounting said hand lever on said pin, an extension on said hand lever, a fork receiving said extension, a hollow rock shaft operatively connected to said fork, a spindle secured to said housing, means pivotally mounting said rock shaft on said spindle, a clutch and an associated air pressure operated clutch motor, and said control valve mechanism also including a clutch interlock control actuated by compressed air derived from said associated air pressure operated clutch actuating motor and operable to prevent a gear engaging or gear disengaging movement of the gear shift motor until the clutch is disengaged, said clutch interlock control comprising a number of lugs on said rock shaft arranged to co-act with a corresponding number of fingers carried by pistons movable in chambers adapted to be connected to receive said derived compressed air whereby, when the clutch is withdrawn, said pistons are displaced and said fingers are moved out of engagement with said lugs to permit a chosen gear to be selected by movement of said hand lever.

7. A fluid pressure operated gear changing system comprising a control valve mechanism, a gear selector motor and a gear shift motor each operable connected to said control valve mechanism, said valve mechanism including a manually operable hand lever movable in a first plane to effect an operation of the gear selector motor and movable in a second plane at right angles to the first to effect operation of the gear shift motor, a clutch and an associated air pressure operated clutch motor, and said control valve mechanism also including a clutch interlock control actuated by compressed air derived from said associated air pressure operated clutch actuating motor and operable to prevent a gear engaging or gear disengaging movement of the gear shift motor until the clutch is disengaged, and sensing means for indicating when a selected gear has been engaged, said sensing means comprising a pair of spring-loaded pistons arranged to bear on arms provided on a member associated with the hand lever and adapted to maintain the said hand lever in position once it has been moved from neutral to a gear position or vice versa.

8. A gear changing system according to claim 7, wherein said member is a rock shaft for said hand lever.

9. A fluid pressure operated gear changing system operatively associated with a power train including a clutch actuated by a fluid pressure motor connected through control means to a source of fluid pressure, said system comprising a gear selector motor and a gear shift motor, a control valve mechanism in said system operably connected to said motors, a manually operable hand lever for said control valve mechanism movable along a path to effect an operation of said gear selector motor and movable at certain positions along said path in angular relation to said path to effect an operation of said gear shift motor to effect gear engagement or gear disengagement, a rock shaft in said system operatively connected to said hand lever and adapted for rocking movement to effect control of said gear shift motor, and means in said system operatively connected to said clutch actuating motor control means for preventing said hand lever from movement to effect said gear engaging or gear disengaging operation of said gear shift motor except when said clutch is in disengaging condition comprising pressure responsive latch means releasably holding said shaft against said rocking movement.

References Cited

UNITED STATES PATENTS

| | | |
|---|---|---|
| 2,137,939 | 11/1938 | Eaton. |
| 2,157,592 | 5/1939 | Casler. |
| 2,753,024 | 7/1956 | Weaving et al. |
| 2,753,025 | 7/1956 | Reis. |
| 3,292,751 | 12/1966 | McRay et al. |

BENJAMIN W. WYCHE III, Primary Examiner

U.S. Cl. X.R.

91—414; 137—637.1